United States Patent [19]

Sakurai et al.

[11] Patent Number: 4,671,612
[45] Date of Patent: Jun. 9, 1987

[54] OPTICAL FIBER ARRAY PLATE

[75] Inventors: Akiyoshi Sakurai, Tokyo; Akihiro Koga; Toru Kambara, both of Kanagawa, all of Japan

[73] Assignee: Asahi Glass Company, Ltd., Tokyo, Japan

[21] Appl. No.: 881,570

[22] Filed: Jul. 2, 1986

Related U.S. Application Data

[63] Continuation of Ser. No. 523,605, Aug. 16, 1983, abandoned.

[30] Foreign Application Priority Data

Aug. 24, 1982 [JP] Japan .................. 57-126849[U]

[51] Int. Cl.4 .................................. G02B 6/08
[52] U.S. Cl. .................. 350/96.27; 350/96.10; 350/96.24; 250/566
[58] Field of Search .......... 350/96.24, 96.25, 96.27; 250/566; 355/1

[56] References Cited

U.S. PATENT DOCUMENTS

| | | | |
|---|---|---|---|
| 3,237,039 | 2/1966 | Fyler | 350/96.27 |
| 3,247,756 | 4/1966 | Siegmund | 350/96.27 |
| 3,272,063 | 9/1966 | Singer, Jr. | 350/96.24 |
| 3,544,713 | 12/1970 | Case | 250/211 R |
| 3,581,102 | 5/1971 | Nagao et al. | 350/96.27 X |
| 3,589,795 | 6/1971 | Miyazaki et al. | 350/96.27 |
| 3,609,233 | 9/1971 | Nago et al. | 350/96.27 X |
| 3,786,238 | 1/1974 | Heisner | 250/566 |
| 3,796,905 | 3/1974 | Tomii et al. | 350/96.27 X |
| 3,860,753 | 1/1975 | Tsuneta et al. | 350/96.27 X |
| 4,232,219 | 11/1980 | Yamamoto et al. | 250/227 |

FOREIGN PATENT DOCUMENTS

| | | | |
|---|---|---|---|
| 0042332 | 4/1977 | Japan | 250/566 |
| 0118376 | 9/1981 | Japan | 350/96.27 |

Primary Examiner—William L. Sikes
Assistant Examiner—Akm E. Ullah
Attorney, Agent, or Firm—Oblon, Fisher, Spivak, McClelland & Maier

[57] ABSTRACT

An optical fiber array plate for an optical reading system, which comprises an optical fiber array sandwiched by outer glass layers, characterized in that said optical fiber array is composed of parallel array of a great number of optical fibers having no light absorber, and the arrangement is such that an incident ray is led to pass through the outer glass layers and the optical fiber array and irradiate an original placed at a reading end surface of the optical fiber array and the reflected ray from the original is led through the optical fibers to a photoelectric converter.

5 Claims, 7 Drawing Figures

OPTICAL FIBER ARRAY PLATE

This application is a continuation of application Ser. No. 523,605, filed Aug. 16, 1983 now abandoned.

BACKGROUND OF THE INVENTION

1. Field of the Invention

The present invention relates to an optical fiber array plate, and more specifically, to an optical fiber array plate for an optical reading system.

2. Description of the Background

An optical fiber array plate for an optical reading system comprises an optical fiber array sandwiched by outer glass layers. This optical fiber array is composed of parallel array of a great number of optical fibers. In the conventional optical fibers to be used as an image guide of an optical reading system, a light absorber is provided in surrounding or interstitial relation with a cladding of optical fibers, to prevent leakage of light and thereby to improve the image-transmission efficiency.

In case of the fiber plate composed of optical fibers having a light absorber used in contact with the paper surface of the original for reading, it is necessary to cut off the portion of the fiber array plate which hinders the incident ray from a light source in order to permit the incident ray to directly irradiate the paper surface of the original. Accordingly, the number of facets to be cut and polished increases, and consequently the production costs will increase.

The present invention is an improvement of such a conventional optical fiber array plate, wherein the light absorber is removed from the optical fibers constituting the optical fiber array, and the incident ray is permitted to pass through this optical fiber array at some angles and irradiate the original, and the reflected ray is led through the optical fiber array to a photoelectric converter.

Namely, the present invention provides an optical fiber array plate for an optical reading system, which comprises an optical fiber array sandwiched by outer glass layers, characterized in that said optical fiber array is composed of parallel array of a great number of optical fibers having no light absorber, and the arrangement is such that an incident ray is led to pass through the outer glass layers and the optical fiber array and irradiate an original placed at a reading end surface of the optical fiber array and the reflected ray from the original is led through the optical fibers to a photoelectric converter.

Now, the present invention will be described in detail with reference to the preferred embodiments illustrated in the accompanying drawings.

In the drawings, FIG. 1 is a cross sectional view of the conventional optical fiber array plate for an optical reading system.

Figure 1:
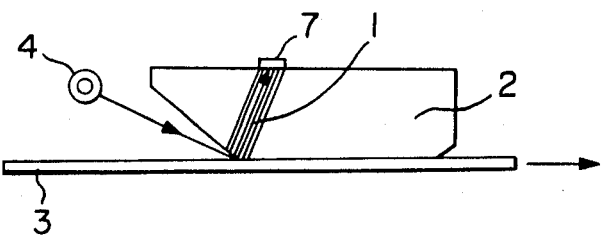

In the Figures, reference numeral 1 designates an optical fiber array, numeral 2 designates an outer glass layer, numeral 3 designates an original, and numeral 4 designates a light source. FIG. 1 illustrates a conventional optical fiber array plate for an optical reading system, wherein the optical fiber array is composed of optical fibers having a light absorber. In such an optical fiber array plate, it is necessary to cut off the portion of the fiber array plate which hinders the incident ray from the light source so that the incident ray directly irradiates the paper surface of the original, thus leading to the disadvantages as mentioned above.

Figure 2:
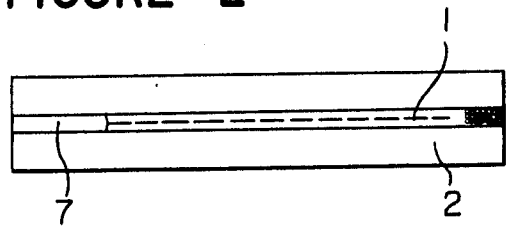
FIG. 2 is a plane view of an optical fiber array plate according to the present invention.

FIG. 2 is a plane view of the optical fiber array plate according to the present invention. The optical fiber array plate comprises an optical fiber array 1 sandwiched by outer glass layers 2. The outer glass layers 2 are usually made of transparent glass. However, in some cases, particularly when the optical fiber array 1 is composed of plastic optical fibers, the outer glass layers may be substituted for a transparent plastic. Thus, the material of the outer glass layers is not restricted to glass, and includes other transparent materials such as transparent plastics.

Figure 3:
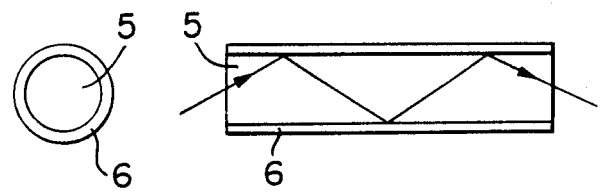
FIG. 3 is a diagrammatic view of the optical fiber (Step Index type).

FIG. 3 illustrates an optical fiber constituting the optical fiber array 1. As shown in FIG. 3, the optical fiber consists of the core 5 and the cladding 6 covering the core, and does not have a light absorber. The optical fiber array 1 is formed by parallel arraying a great number of such optical fibers.

Figure 4:
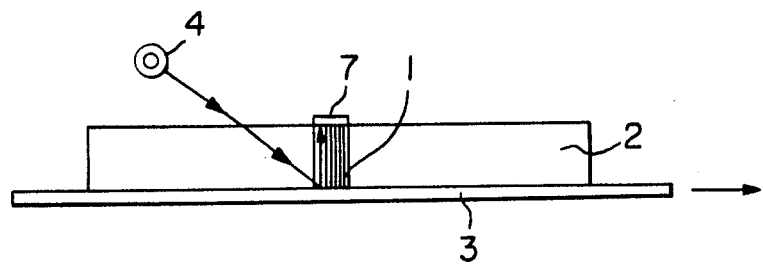
FIG. 4 is a cross sectional view illustrating a reading manner with the optical fiber array plate according to the present invention.

FIG. 4 is a cross sectional view illustrating the manner of reading the original by means of the optical fiber array plate of the present invention, wherein the incident ray from a light source 4 enters and advances obliquely towards the reading end surface of the optical fiber array 1. The incident ray passes through the outer glass layer 2 and the optical fiber array 1 and irradiates the paper surface of the original 3, and the reflected ray is led through the optical fibers of the optical fiber array 1 to a photoelectric conversion portion 7. As mentioned above, the optical fibers of the optical fiber array 1 are not provided with a light absorber, and accordingly a part of the incident ray from the light source 4 passes through the optical fiber array and irradiates the reading portion of the original 3.

Figure 5:
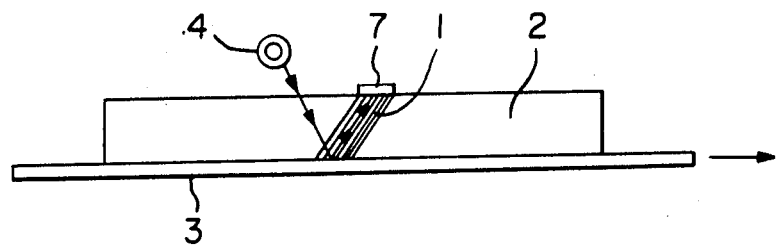
FIG. 5 is a cross sectional view illustrating another embodiment of the present invention wherein the fiber array is disposed with an angle of inclination.

As shown in FIG. 4, in a case where the optical fiber array 1 is disposed to be perpendicular to the plane of the original, the quantity of light reflected on the surface of the original and reaching the photoelectric conversion portion 7 will be from about 10 to about 15% of the incident ray. The quantity of light of this degree is adequate for the reading. However, as shown in FIG. 5, the quantity of the reflected ray can be increased by disposing the optical fiber array 1 at some angle to the plane of the original. The angle of inclination of the optical fiber array 1 is preferably from 10° to 30° relative to the perpendicular to the plane of the original.

Figure 6:
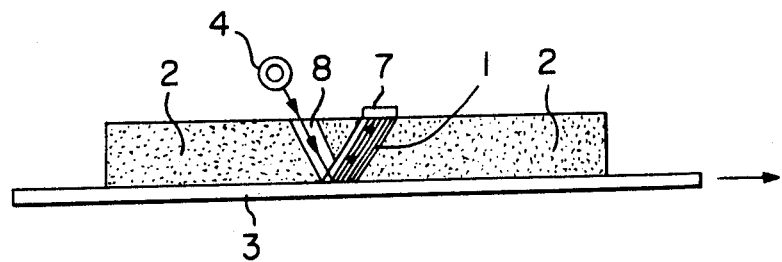
FIGS. 6 and 7 illustrate further embodiments of the present invention wherein means for preventing stray light are provided.
Figure 7:
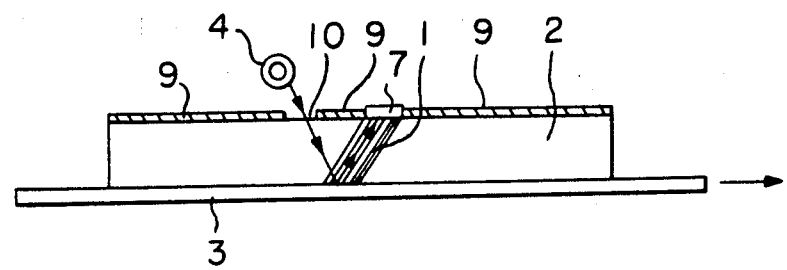

FIGS. 6 and 7 illustrate other embodiments of the present invention. In the embodiment shown in FIG. 6, the outer glass layers 2 are made of a light absorbing material such as colored glass, preferably black glass, to minimize the entrance of unnecessary stray lights into the optical fiber array 1, and the portion corresponding to the pathway 8 of the incident ray is made blank or a transparent material such as a synthetic resin is filled in this portion. With this construction, even when unnecessary stray light are irradiated to the outer glass layers 2, the stray lights will be absorbed by the colored glass and will not substantially enter into the optical fiber array 1. The necessary incident ray from the light source can be led through the pathway 8 made of a transparent material to the reading end surface of the optical fiber array 1.

On the other hand, in the embodiment shown in FIG. 7, a stray light preventive film 9 is provided on the top surface of the outer glass layers 2 except for the portions corresponding to the entrance window 10 for the incident ray and the photoelectric conversion portion 7. It is effective to provide this stray light preventive film 9 at a portion of the outer glass layers 2 where stray light is most likely to enter. Thus, the stray light preventive film may be provided at an optional portion other than the above-mentioned top surface.

As the outer glass layers 2 of the present invention are usually made of glass in view of the wear resistance and durability. However, they may be made of a synthetic resin. Thus, the outer glass layers 2 are not restricted to glass layers, but include other transparent materials such as synthetic resin materials.

According to the present invention, the incident ray can be led to the reading end surface of the optical fiber array through the outer glass layers and the optical fiber array, to irradiate the surface of the original, therefore it is unnecessary to cut off a portion of the outer glass layers in the case of the conventional optical fiber array plate. Accordingly, the efficiency for the mass-production will thereby be improved, and it is thereby possible to produce the products at low costs. Even without using a light absorber for optical fiber array, the image transmission efficiency is not substantially affected by stray light for practical use. However, the image transmission performance can be improved by providing a light absorbing means as illustrated by the embodiment of FIG. 6 or 7 to shut out the stray lights from outside.

We claim:
1. An optical fiber array plate in combination with an optical reading system having a light source, which comprises:
   a parallel array of optical glass fibers which have no light absorber sandwiched between a pair of transparent material layers such that a surface defined by one end of the array of glass fibers constitutes a reading surface of the array, said array plate receiving incident light from a light source positioned so that said incident light passes through the transparent material layers and glass fibers of the array plate, so as to be reflected off of a paper surface of an original placed contiguous to said reading surface of the array plate into and through said glass fibers with the reflected light being received by a photoelectric converter positioned at a top surface of said fiber array plate to receive the light passing through said glass fibers, wherein said optical fiber array is positioned at an angle of inclination of from 0° to 30° relative to the perpendicular to said reading surface; and
   a light absorbing material associated with said transparent material layers at a location between said light source and said fibers except for the portion of said transparent material layers in a path through which said incident light passes to strike the paper surface of said original.

2. The optical fiber array plate of claim 1, wherein the light source for said incident light is positioned above the optical fiber array plate.

3. The optical fiber array plate of claim 1, wherein said transparent material is a synthetic resin.

4. The optical fiber array plate of claim 1, wherein said transparent material is glass.

5. The optical fiber array plate of claim 1 wherein said light absorbing material is contained in said transparent material layers.

* * * * *